Jan. 7, 1964     E. W. MADSEN     3,117,268
ELECTRIC MOTOR CONTROL CIRCUIT
Filed Oct. 26, 1960     3 Sheets-Sheet 1

INVENTOR.
Elmer W. Madsen
BY
Johnson and Kline
ATTORNEYS

Jan. 7, 1964 E. W. MADSEN 3,117,268
ELECTRIC MOTOR CONTROL CIRCUIT
Filed Oct. 26, 1960 3 Sheets-Sheet 3

INVENTOR.
Elmer W. Madsen
BY
Johnson and Kline
ATTORNEYS

United States Patent Office 3,117,268
Patented Jan. 7, 1964

3,117,268
ELECTRIC MOTOR CONTROL CIRCUIT
Elmer W. Madsen, Bristol, Conn., assignor to The Superior Electric Company, Bristol, Conn., a corporation of Connecticut
Filed Oct. 26, 1960, Ser. No. 65,039
16 Claims. (Cl. 318—283)

The present invention relates to a control circuit for controlling the rotational movement of an electric motor whereby electrical signals are capable of automatically controlling the movement of the motor.

An electric motor used with the herein described invention of a control circuit may, by proper energization thereof, effect incremental rotational movement in either direction or an energized stop or holding position. Such a motor may be of the synchronous inductor type having a permanently magnetized rotor and a plurality of circularly disposed stator poles magnetized upon energization of stator windings. By selective energization of the windings of the stator poles the desired movement or nonmovement of the rotor of the motor may be achieved.

A motor of this general type is shown in United States Patent No. 2,931,929 granted to A. E. Snowdon et al. on April 5, 1960, and the motor, as will be hereinafter apparent, is slightly modified to render it capable of more satisfactory operation by the control circuit of the present invention in response to electrical signals applied at the input terminals to the control circuit. It is understood, however, that the invention is not to be limited exclusively to the motor disclosed but is to be considered as employable with any motor that it is capable of controlling.

An object of the present invention is to provide a control circuit for a motor which enables the movement of the motor to be controlled by electrical signals, such as pulses, including those on the order of 200 pulses per second.

Another object of the present invention is to provide a control circuit which enables a motor to be rotated in incremental steps in either direction and yet, without any signal being applied, maintains the motor energized at a hold or stop position which is the position to which it was last moved.

A further object of the present invention is to provide a control circuit that achieves the above objects and which is reliable in operation, durable in use and may be easily interconnected with the motor that it controls.

In carrying out the present invention, in the embodiment herein described, the motor is provided with four terminals and a common ground and for effecting rotation of the motor two of the terminals are energized at a time in a sequential order, the terminals being connected to selected windings of the stator poles. Thus, if the four motor terminals are denoted A, A', B and B', the order of energization to effect rotation in one direction is A and B, A and B', A' and B', A' and B, A and B, etc., with each change of energization of the terminals effecting an incremental advancement or step of the motor.

In one embodiment of the motor, 200 steps are required for one complete revolution and in order to correlate the pulses to the motor movement, the present embodiment of the invention provides for each pulse signal on the input of the control circuit to cause one step of the motor. Hence with 200 pulse signals per second applied to the control circuit, the motor will rotate at one revolution per second.

The above-noted sequence of energization of the terminals of the motor produces rotation in one direction and in order to cause reverse incremental rotation the sequence of energization is reversed. Thus, for reverse rotation the sequence of energization of the terminals is A and B, A' and B, A' and B', A and B', A and B, etc.

While the same input terminal may be used and pulses of different characteristics used for controlling rotation in one direction or the other, the control circuit of the present invention obviates the need for pulse differentiating circuitry by employing a first input terminal for pulses that control rotation in one direction and a second input terminal on which pulses are impressed for causing reverse rotation. By the use of two input terminals, one for each direction of movement of the motor, the control circuit is rendered more dependable over a wider variety of environmental conditions since each pulse whether on one input terminal or the other may be of the same character and the control circuit accurately tuned to the characteristics of the input pulses.

A further feature of the present invention resides in the control circuit, in the absence of any pulse which causes environmental movement, maintains the motor energized at the position to which it was moved by the last pulse. This is decidedly advantageous in that not only does the motor thereby exert a holding torque when the rotor is stationary, but moreover such action in effect causes the motor to be braked at its last moved position, thereby enabling effective correlation of the movement of the motor to the pulses. Any "over running" or momentum movement of the motor when no pulses are applied at the input terminals is accordingly prevented.

Other features and advantages will hereinafter be apparent.

Figure 1:
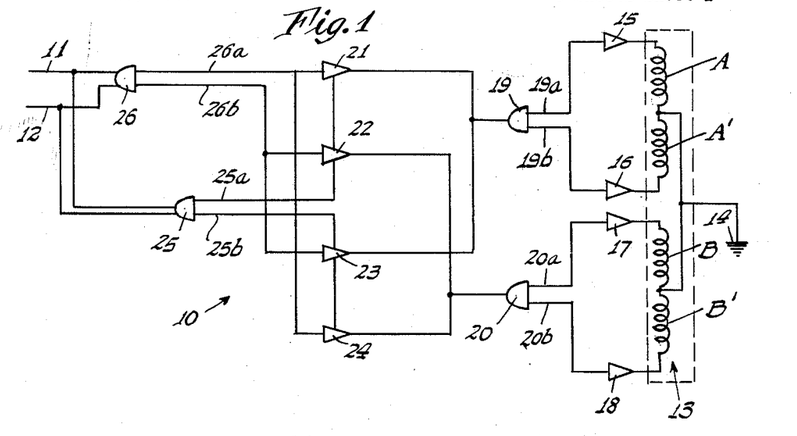
FIGURE 1 is a block diagram of the motor control circuit of the present invention.

Referring to the block diagram shown in FIG. 1 of the motor control circuit of the present invention, the complete control circuit is generally indicated by the reference numeral 10 and includes a clockwise input channel 11 and a counterclockwise input channel 12. The output of the motor control circuit is employed to energize windings of a motor 13 with the windings being schematically shown in this figure and being indicated by the reference characters A, A', B and B'. The windings are electrically connected in the manner shown so that adjacent ends of the windings A and A' are connected together as are the ends of windings B and B' and then to a common ground 14. In order to enable independent energization of each of the four windings, there are provided output switches 15, 16, 17 and 18 which serve to individually control the energization of the windings A, A', B and B' respectively.

In order to achieve rotation of the motor, two windings are energized at a time with successive pulses applied on the clockwise channel 11, for example, causing the following sequence of conduction through switches 15 and 17, 15 and 18, 16 and 18, 16 and 17, 15 and 17, 15 and 18, etc. with resulting energization of the windings AB, AB', A'B', A'B, AB, AB', etc. For reverse direction, the sequence of energization is reversed and thus the sequence of energization of the windings is AB, A'B, A'B', AB', etc., resulting from pulses applied on the counterclockwise channel 12 to produce this reverse rotation.

With this mode of operation of the control circuit, forward and reverse movement of the motor may be effectively achieved. For example, for three steps forward, two reverse and then forward again, three pulses on the channel 11 are required to produce conduction through the switches to energize windings AB, AB', A'B', then two pulses on the counterclockwise channel 12, to produce sequential energization of the windings AB', AB, and then further pulses on the clockwise channel 11 produce sequential energization of the windings A'B', A'B, AB, etc.

It will be clear that at any position of the motor, when no pulse is applied at either input channel, then the windings that are energized remain energized. Moreover, there are always two windings energized at a time with the other two windings being unenergized and only a pulse on either channel can effect a change in the state of the energized and unenergized windings, with each change producing an incremental movement of the motor.

In order to control the desired sequence of conduction and non-conduction of the switches 15, 16, 17 and 18, switches 15 and 16 are connected to a first output directional control means 19, while the output switches 17 and 18 are connected to a second output directional control means 20. The two directional control means each has an input connected to be received from gates 21, 22, 23 and 24 with the gates 21 and 23 being connected to effect a change in the state of the first output directional control means 19, while the gates 22 and 24 effect a change in the state of the second output directional control means 20.

The first output directional control means has two output channels 19a and 19b, with the channel 19a being connected to the switch 15 and the channel 19b to the switch 16, while the second directional control means 20 also has two output channels 20a and 20b with the channel 20a being connected to the switch 17 and the channel 20b to the switch 18. Only one channel of each of the directional control means is energized at a time and when the state of this means is changed, the energization is shifted from one channel to the other. Accordingly, when either one of the directional control means receives a signal from its associated gates, it shifts energization of its channels and causes a change from conduction to non-conduction of the switches controlled by the channel that is changed from being energized to being non-energized and cause conduction through the switch that is controlled by the channel that is changed from being non-energized to being energized.

To effect the control of the gates 21 through 24 in producing a signal that changes the state of the directional control means, there is provided a gate conditioning means 25 having two output channels 25a and 25b, one channel 25a being connected to the gates 21 and 22 and the other channel 25b being connected to the gates 23 and 24. Thus one of the output channels 25a and 25b of the gate conditioning means is energized and the other deenergized at all times and a change of state of the gate conditioning means shifts the energization from one channel to the other. The effect of the energized channel on its associated gates is to only condition these gates for producing a signal to the directional control means without actually producing the signal, while the gates associated with the deenergized channel are rendered non-responsive to a condition which causes conduction through the gates so conditioned by the energized channel of the gate conditioning means.

To produce such a condition that would render the conditioned gates conductive, there is provided a gate trigger means 26 which also has two output channels 26a and 26b with the channel 26a connected to effect operation of the gates 21 and 24 while the channel 26b is connected to effect operation of the gates 22 and 23. The gate trigger means with each input pulse functions to produce an output alternately on its output channels which when applied to a gate conditioned by the gate conditioning means causes conduction through said gate. However, this signal is insufficient, when applied to a gate that is non-responsive, to effect conduction of said gate, and hence has no effect thereon.

The input terminals 11 and 12 are connected directly to the gate trigger means 26 and the gate conditioning means 25 so that both receive the input pulse signal. As will be hereinafter apparent, the gate conditioning means 25 functions initially, i.e. first in time, to condition either the gates 21 and 22 or 23 and 24 to be conditioned for conduction by a signal from the gate trigger means. This is an important feature of the present invention of an electric motor control circuit since it enables the gate conditioning means to effect the conditioning of the gates required prior to the gates being triggered whether the pulse signal is on the clockwise terminal 11 or the counterclockwise terminal 12.

In the operation of the control circuit of the present invention with pulses appearing on the clockwise channel 11, the windings will be sequentially energized in the above set forth order. Upon energization of the control circuit two of the windings will be energized, and presupposing that these initially energized windings are A and B, the first pulse will effect energization of the windings AB'. With the windings AB energized, the gate conditioning means 25 has conditioned through channel 25a the gates 21 and 22. The pulse on the input channel 11 will not shift the conditioning of the gates 21 and 22, for reasons which will hereinafter be apparent. However, the gate trigger means 26, after receipt of the pulse, sends a signal on channel 26b which renders gate 22 conductive to cause a signal to the second output directional control 20 which causes a change in state of this means to cause a shift in the channel 20a to a non-energized condition while the channel 20b shifts from being non-energized to being energized. This renders the switch 18 to become conductive to thereby energize the winding B'. The winding A is maintained energized since no signal is received by the first output directional control means 19 which would change its state.

The circuit remains with the windings AB' energized until the next pulse is received by the gate trigger means and the gate conditioning means. If the pulse is on the clockwise channel 11, no change is effected in the gate conditioning means so that the gates 21 and 22 remain conditioned for conducting. After receipt of the pulse, the gate trigger means shifts its energization to cause channel 26a to conduct a signal to the gates 21 and 24. The gate 24 is not conditioned to pass a signal whereas the gate 21 is and hence a signal is passed therethrough to the first output directional control means which has its state changed so that the channel 19a becomes deenergized while the channel 19b becomes energized. Hence switch 15 is rendered non-conducting while switch 10 is rendered conducting. This causes the winding A to become deenergized and the winding A' to become energized so that the windings A' and B' are energized and thus the proper sequence of energization of the windings for causing clockwise rotation of the motor is effected.

The next pulse on the clockwise channel 11 again causes no change in the gate conditioning means but renders the channel 26b energized which causes a signal to be passed from the gate 22 to the second output directional control means 20 thereby causing deenergization of the channel 20b and energization of the channel 20a to effect conduction through the switch 17 and non-conduction through the switch 18. Thus the windings A'B are energized.

The next pulse on the channel 11 again effects no change in the gate conditioning means 25 but causes a signal to be passed on the channel 26a to cause gate 21 to pass the signal that changes the state of the first output directional control means to result in switch 15 becoming conductive and switch 16 non-conductive thereby energizing the windings A, B. Sequential pulses through the clockwise channel will in a like manner cause the sequence of energization of the windings to be continued and thereby rotation of the motor one incremental step in the same direction for each pulse on the input terminal 11.

The control circuit of the present invention also provides for enabling the control of the motor to be moved in the opposite direction and this is achieved by pulse signals impressed on the counterclockwise input terminal 12. Thus, with the windings AB energized to cause reverse rotation, then windings A'B must be energized by the next pulse to produce counterclockwise rotation of the rotor of the motor. Accordingly, a pulse at the input terminal 12 is received by the gate conditioning means and this means is caused to shift its change of state to result in energization through the channel 25b to render the gates 23 and 24 conditioned for conducting and turns off the gates 21 and 22 by rendering the channel 25a non-conducting. The pulse signal has the same effect on the gate trigger means as pulses on the other input channel and hence it changes its state so that the signal is sent to the channel 26b which causes conduction through the gate 23 (none through the gate 22 because it is non-responsive) and this in turn changes the state of the first output directional control means from having channel 19a energized to having channel 19b energized. Thus the winding A is deenergized by non-conduction through the switch 15 while the winding A' is energized by conduction through the switch 16. Further reverse rotation of the motor is achieved by the windings A', B' being energized and accordingly a pulse at the terminal 12 has no effect on the gate conditioning means, thus leaving gates 23 and 24 conditioned to be conducting while the channel 26a becomes energized to cause gate 24 to be conducting, altering the state of the second output directional control means 20 which shifts its energization from the channel 20a to the channel 20b and hence causes energization of the winding B' with simultaneous deenergization of the winding B. Further pulses on the counterclockwise channel will cause the windings AB', AB to be energized in the necessary sequence.

From the above description of the operation of the device it will be appreciated that the gate conditioning means does not change its state with every input signal but only changes its state when the input signals change from one input channel to the other to thereby indicate a reversal of the movement of the motor by a reversal in the sequence of energization of the windings.

Figure 2:
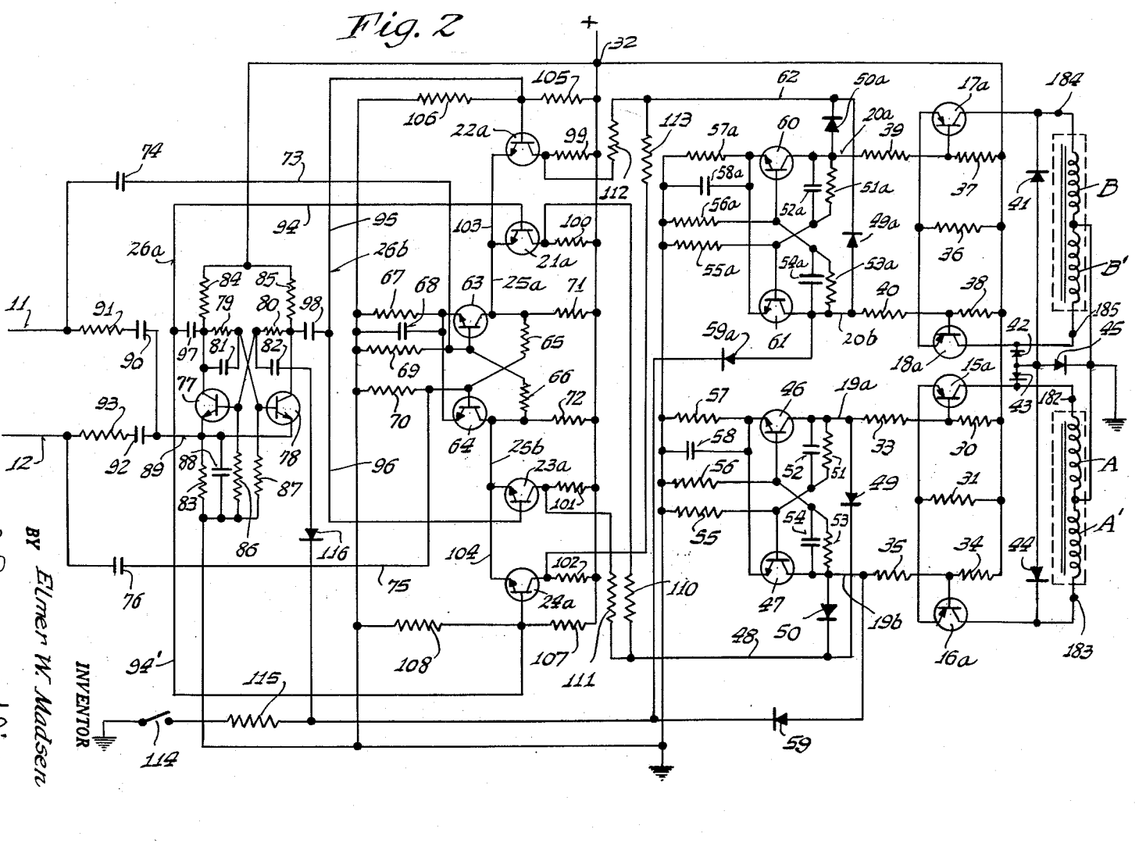
FIG. 2 is an electrical schematic diagram thereof.

Referring specifically to the electrical schematic diagram of the control circuit shown in FIG. 2, the windings of the electric motor are shown contained within dotted lines and indicated by the same reference characters hereinbefore employed, namely A, A', B and B'. Connected to the winding A is the switch 15 which includes a PNP transistor 15a and its accompanying circuit including a base biasing resistor 30 and an emitter biasing resistor 31 both connected to one side 32 of a 12 volt D.C. filtered supply of electrical energy. The base is further connected through a resistor 33 to the channel 19a of the first output directional control means 19 such that the resistor 33 is used to adjust the voltage at the base of the transistor 15a with respect to its emitter to thereby enable control of conduction through the emitter-collector circuit of the transistor. It will thus be seen that normally the transistor 15a is non-conductive through its emitter-collector circuit which controls the flow of current to the winding A by reason of the emitter voltage being insufficiently positive with respect to the base voltage but when the voltage in the base is decreased by a voltage drop across the resistor 33, the transistor 15a is rendered conducting in the emitter-collector circuit to energize the winding A.

Similarly, the switch 16 for the winding A' includes a transistor 16a and a resistor 34 having the same function and value as the resistor 30 while the base of the transistor 16a is connected through a resistor 35 (identical to the resistor 33 in function and value) to the channel 19b of the first output directional control means. The emitter biasing resistor 31 is common to both transistors 15a and 16a.

The switches 17 and 18 for controlling energization of the windings B and B' respectively are similar to the switches 15 and 16 and hence include transistors 17a and 18a, emitter biasing resistor 36 and base biasing resistors 37 and 38 for the transistors 17a and 18a respectively. The base of the transistor 17a is connected through a resistor 39 to the output channel 20a of the second output directional control means while the base of the transistor 18a is connected to the channel 20b through a resistor 40. The resistors 33, 35, 39 and 40 all have a value of 220 ohms, the resistors 30, 34, 37 and 38 have a value of 330 ohms, the resistors 31 and 36 have a value of 1 ohm and each of the transistors 15a, 16a, 17a and 18a are type 2N351.

Each of the windings A, A', B and B' by their change in energization creates in the circuit a counter E.M.F. or inductive "kick" which the present invention obviates by the use of four diodes 41, 42, 43 and 44, connected in the manner shown through a Zener diode 45, to remove all induced voltages in excess of the Zener rating of the Zener diode 45. The diodes 41 through 44 serve to block all positive voltages which may occur from accidental increases in power supply voltage and thus protect the Zener diode 45. The diodes are type 1N91 while the Zener diode is a type 1.5M11Z. This arrangement of diodes and Zener diode when employed in the control circuit of the present invention having low voltage transistors that are sensitive to trigger pulses, obviates the problem of dissipating the induced voltages without using a circuit that is sensitive to a frequency at which the windings are energized.

Each of the output directional control means is essentially a direct coupled transistor logic flip-flop circuit and hence the first output directional control means has a first transistor 46 controlling channel 19a and a second transistor 47 controlling channel 19b. With this type of circuit one transistor is always conducting and as the other is rendered conducting by a pulse or voltage change on the trigger input, the first transistor is turned "off." Accordingly there is provided a lead 48 connected through diodes 49 and 50 to the collectors of the transistors 46 and 47 respectively; the diodes 49 and 50 are employed as collector triggering steering diodes. Connected between the collector of the transistor 46 and the base of the transistor 47 is a resistor and condenser network 51 and 52 respectively, while similarly the collector of the transistor 47 and the base of transistor 46 have a resistor and condenser network of resistor 53 and condenser 54. Current limiting resistors 55 and 56 are connected between the ground and the bases of transistors 47 and 46, while a resistor 57 and a condenser 58 are connected in the emitter-collector circuit to the ground. Further a diode 59 is connected to the channel 19b for reasons which will be hereinafter apparent. This structure specifically employs as transistors 46 and 47 type 2N585, the resistors 51 and 53 have a value of 4.7K ohms, the diodes 49, 50 and 59 are type 1N91, the resistors 55 and 56 have a value of 6.8K ohms, resistor 57, 39 ohms and condensers 52, 54 and 58, .1 mf.

It will be appreciated that with this circuit each signal on the lead 48 causes the output directional control means to shift conduction from the collector emitter of one transistor to conduction through the other and wherever conduction is occurring the associated switch transistor 15a or 16a is rendered conducting, while with the non-conduction through the associated transistors 46 or 47, the other switch transistor is rendered non-conducting.

The second output directional control means 20 is identical in structure to the above described first output directional control means 19 and accordingly includes a transistor 60 controlling the channel 20a and a transistor 61 controlling the channel 20b, with the signal to the second output directional control means being through a triggering lead 62. The other components in this second output directional control means have been given the same number as in the first directional control means except for the addition of the subscript "a" thereto, with the values of the elements being the same.

The gate conditioning means 25 includes two transistors 63 and 64 with the collector-emitter of the transistor 63 controlling the conduction through the channel 25a while the collector-emitter of the transistor 64 controls conduction through the channel 25b. The transistors 63 and 64 are interconnected to constitute a base-triggering direct coupled flip-flop circuit and hence the collector of the transistor 63 is connected through a resistor 65 to the base of the transistor 64 while the collector of transistor 64 is connected to the base of transistor 63 through a resistor 66, the resistor 65 and 66 each having the value of 10K ohms. The emitters of the two transistors are connected through a common resistor 67 (having a value of 150 ohms) and a condenser 68 (having a value of .10 mf.) to the ground while each base of the transistors 63 and 64 is connected through a resistor 69 and 70 respectively (each having a value of 2.7K) to the ground. The collectors of the transistors 63 and 64 also are connected through resistors 71 and 72 respectively to the positive supply 32.

The clockwise input terminal 11 is connected by a lead 73 including a signal passing D.C. blocking condenser 74 (.01 mf.) to the base of transistor 63 while the input terminal 12 is similarly connected through a lead 75 including a condenser 76 (.01 mf.) to the base of the transistor 64.

With this construction of the gate conditioning means 25 it will be appreciated that if, for example, the transistor 63 is "on," then the transistor 64 will be "off," and any input signal pulses through a lead 73 from the clockwise input terminal 11 to the base of transistor 63 will not effect a change in conduction thereof since there is sufficient potential with or without the potential of the pulse between the base and the emitter of the "on" transistor 63 to maintain the collector-emitter circuit thereof conducting. However, with transistor 63 "on" and if an input signal is applied at the counterclockwise terminal 12, then a positive voltage is applied at the base of the transistor 64 which is sufficient to create a potential difference between the base and the emitter thereof to effect conduction through the collector-emitter circuit. Moreover, upon conduction therethrough by reason of the coupling resistor 66, the potential between the emitter and base of the transistor 63 is decreased, turning "off" the transistor 63. The manner in which the conduction through the collector-emitter circuits of the transistors 63 and 64 conditions the gates is hereinafter more specifically set forth.

The gate triggering means 26 is also composed of a pair of transistors 77 and 78 constituting a direct coupling transistor flip-flop in which the signal for triggering the flip-flop is applied to the emitters. Accordingly the collector of transistor 77 is connected to the base of transistor 78 through a resistor 79 while the collector of transistor 78 is connected to the base of transistor 77 through a resistor 80 with condensers 81 and 82 paralleling the resistors 79 and 80 respectively. The emitters of the transistors 77 and 78 are connected together and through a resistor 83 to the ground while the collectors of transistors 77 and 78 are connected to the positive D.C. source 32 through resistors 84 and 85 respectively while the bases of the transistors 77 and 78 are connected through resistors 86 and 87 to the ground respectively. A condenser 88 is connected to parallel the resistor 83.

A lead 89 connects the two emitters in parallel and further branches through D.C. blocking condenser 90 and resistor 91 to the clockwise input terminal 11 and through blocking condenser 92 and resistor 93 to the counterclockwise input terminal 12. It will thus be seen that with this flip-flop circuit one or the other of the transistors 77 and 78 is conducting in its emitter-collector circuit. Moreover, with each input pulse, either on the channel 11 or the channel 12, the state of conduction of transistors is reversed.

One output of the gate triggering means is through the channel 26a composed of a lead 94 that connects to the base of a transistor 21a that in the block diagram is part of the gate 21 while a lead 94' connects to the base of a transistor 24a that is part of the gate 24 in the block diagram. Similarly the output signal through the channel 26b is through a lead 95 to the base of a transistor 22a and a lead 96 to the base of a transistor 23a, the transistors 22a and 23a being included in the gates 22 and 23 respectively of the block diagram. Included in the channel 26a is a condenser 97 while the channel 26b includes a similar condenser 98. The gate triggering means employed in the above construction accordingly will shift conduction of the collector-emitter circuit from one transistor to the other.

A feature of the present invention resides in the condensers 97 and 98 which are employed to produce the trigger signal for the gates 21—24 after the gates have been conditioned for conduction. Thus, instead of the normal practice of providing a signal when the collector-emitter circuit of a transistor in a flip-flop circuit is turned "on," the present gate triggering circuit provides a signal only when an "on" transistor has the emitter-collector circuit turned "off." Thus, when the transistor 77, for example, is turned "off" there is a potential increase at the connection of the condenser 97 and the resistor 79, which potential increase is transmitted through the condenser to constitute a positive pulse that is impressed on the bases of transistors 21a and 24a. The condenser 97 functions in a similar manner for the change in state of the transistor 78 to pass the trigger impulse along the channel 26b.

Moreover, with the above construction, it will be clear that the gate conditioning means by reason of it being a base triggered flip-flop has a speed of response which is faster than the emitter triggered flip-flop constituting the gate trigger means and hence the combination of the faster speed of the gate conditioning means and the production of the gate triggering signal by the turning "off" of an "on" transistor results in the assurance that the gates will be conditioned for actuation by the signal from the gate triggering means prior to receipt of the signal actuating the gates.

Each of the gates 21 through 24 includes a transistor indicated by the reference characters 21a, 22a, 23a, 24a respectively. Each of the collectors of these transistors is connected through an identical resistor 99, 100, 101 and 102 to the positive supply 32 for transistors 22a, 21a, 23a and 24a respectively. The emitters of the transistors 21a and 22a are connected in parallel by a lead 103 to the collector of transistor 63 with this lead, in effect, constituting the channel 25a. A lead 104 constituting, in effect, channel 25b, connects the emitters of transistors 23a and 24a to the collector of the transistor 64.

The potential of the base of transistor 22a is set at a determinable value by a pair of resistors 105 and 106 connected between the positive supply 32 and the ground, to constitute a voltage divider with the base of the transistor 22a being connected between the adjacent ends of the resistors. It will also be clear that through the leads 95 and 96, the base of transistor 23a is placed at the same potential as the base of transistor 22a. Similarly resistors 107 and 108 form a voltage dividing network for producing a potential at the base of transistor 24a and through the leads 94 and 94' apply the same potential at the base of transistor 21a. The output signal, i.e. a negative pulse from the gates 21 and 23, is through resistors 110 and 111 to the lead 48 while the output signal from the gates 22 and 24 is through resistors 112 and 113 respectively to the lead 62.

In order to provide a complete disclosure of the present invention, the preferred value of the electrical elements is hereinafter given, though it will be clear that the invention is not to be limited by the specific values of the various elements. Transistors 60, 61, 21a, 22a, 23a, 24a, 63, 64, 77 and 78 are all type 2N585, resistors 65, 66, 79 and 80, 10K ohms, resistors 67, 83, 150 ohms, resistors 69, 70, 2.7K ohms, condensers 68, 74, 76, 81, 82, 88, 90, 92, 97, 98, .01 mf., resistors 71, 72, 1.5K ohms, resistors 84, 85, 1.2K ohms, resistors 86, 87, 99, 100, 101, 102, 106, 108, 110, 111, 112, 113, 3.3K ohms, resistors 91, 93, 220 ohms and resistors 105, 107, 82K ohms.

In the operation of the gates 21–24 inclusive, presupposing that the transistor 63 is conducting in its collector-emitter circuit, there will be at the collector a potential which is applied to the emitters of the transistors 21a and 22a by the lead 103. This potential compared to the potential produced by the voltage dividing network 105 and 106 for the transistor 22a and the resistors 107 and 108 for the transistor 21a will produce a potential difference between the base of transistors 22a and 21a and their emitters which is insufficient to cause conduction through their collector-emitter circuits. This potential difference is just below the potential necessary to cause conduction and accordingly upon a receipt through the lead 94 or 95, of a pulse or signal having a potential that is sufficiently large such that when it is added to the potential difference between the base and emitter of the transistors causes the potential difference to be increased sufficiently to render the transistor receiving the pulse to be conductive.

With respect to the "off" transistor 64 and the transistors 23a and 24a connected to its output channel 25b, the potential in the lead 104 is essentially the potential of the positive supply and hence is much larger than the potential at the bases of these transistors, hence reversely biasing them to an "off" position. The value of the potential of the pulse necessary to render conduction of the transistors 22a and 21a when these are conditioned for conduction by the transistor 63 being "on" is insufficient when added to the potential difference between the bases and emitters of the transistors 23a and 24a to render them conducting. Accordingly, it fails to render these transistors conductive in their emitter-collector circuits in view of their being non-conditioned for conduction.

Conduction through either of the gate transistors 21a through 24a will produce a voltage signal which is impressed on the collectors of either the first or second output directional control means depending upon which gate is conductive. Thus, for example, if the gate 22a is rendered conductive, the signal, which is simply a pulse of negative magnitude, is impressed on the collector of the transistors 60 and 61 and this pulse is of sufficient value and duration to trigger the second output directional control means to cause a change in state of the circuit and hence render the other transistor conducting thereby effecting the switching of the switches 17a or 18a associated therewith.

Interposed between the output from the collector circuit of each of the gates are the resistors 110, 111, 112 and 113 for constituting voltage dropping or current limiting devices to control the size of the signal to the output directional control means.

For starting the circuit of the present invention in order to set the input channels 11 and 12 for clockwise and counterclockwise rotation, there is provided means for initially turning "on" selected transistors. This means includes a switch 114 connected to the ground and through a resistor 115 (1000 ohms) and diodes 59 and 59a to the transistors 47 and 61 respectively and through diode 116 to the transistor 78. Operation of the switch upon starting of the circuit effects the transistors 47, 61 and 78 to an "on" condition thereby assuring that the signals received at the input terminal 11 will effect clockwise rotation of the motor, while signals received at the input terminal 12 will cause counterclockwise rotation of the motor.

Figure 3:
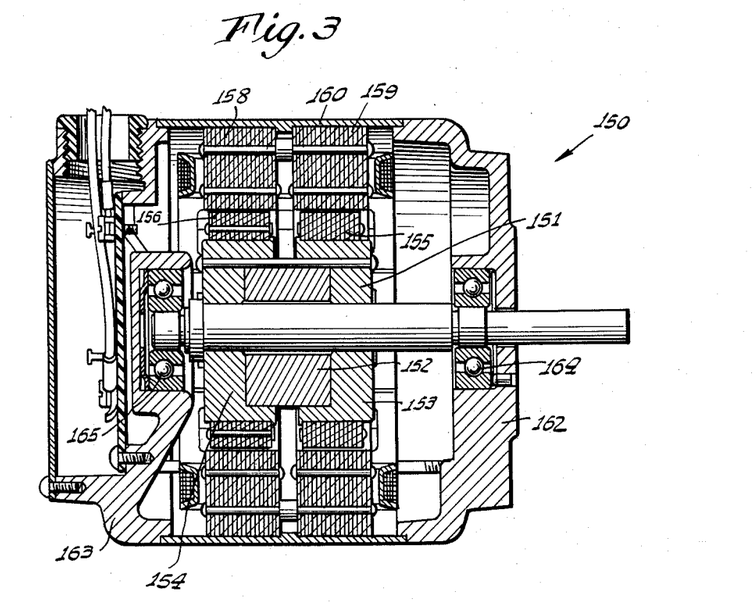
FIG. 3 is an axial section of a motor that may be controlled by the control circuit of the present invention.

Shown in FIG. 3 is an axial cross-section of a motor generally indicated by the reference numeral 150 in which the present invention may be used. The motor includes a rotor 151 having secured thereon a permanent magnet 152, magnetized axially, to magnetize with opposite polarity end caps 153 and 154 secured to the rotor. The periphery of each of the end caps 153 and 154 has a laminated portion 155 and 156 formed with equally spaced teeth 157 (FIG. 4).

The stator includes a pair of laminated annular rings 158 and 159 fixed to a paramagnetic shell 160. The rings 158 and 159 are shaped to form poles, specifically eight poles, in the embodiment of the invention herein described with the inner periphery of the poles being shaped to provide teeth 161 (FIG. 4). The poles are each magnetized by windings and thus there is produced a magnetic path from the magnet 152 to the end cap 153, the portion 155, stator ring 158, paramagnetic shell 160, ring 159, portion cap 156 and cap 154.

The rotor is suitably mounted on frame caps 162 and 163 of the stator as by ball bearings 164 and 165 respectively.

Figure 4:
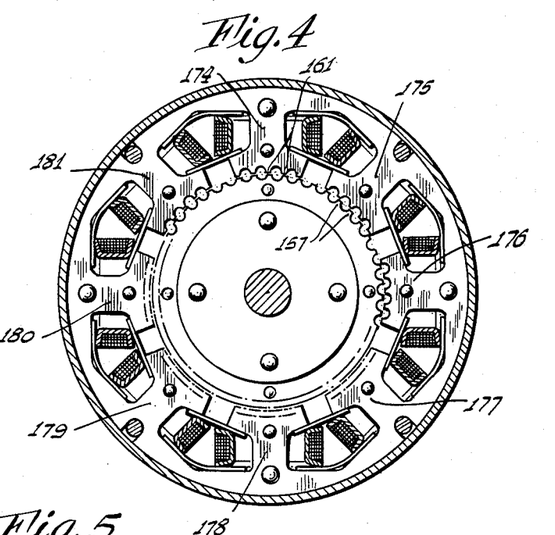
FIG. 4 is a view taken on the line 4—4 of FIG. 3.
Figure 6:
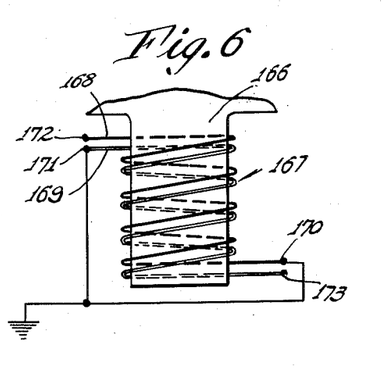
FIG. 6 is a detail thereof.

As shown in FIG. 4, the stator rings are each formed to provide eight poles equally spaced about the periphery of the rotor with teeth being formed on the peripheral edge of each of the stator poles for cooperation with the teeth 157 formed on the portions 155 and 156. Shown in FIG. 6 is a diagrammatic illustration of a stator pole and its magnetizing coil with this pole being indicated by reference numeral 166, and the coil by reference numeral 167. As shown, the coil for the pole is composed of separate windings, one 168 being shown in solid line and the other 169 being shown by a double line. The two windings are wound together in the same direction on the pole as if they were a single strand. However, it will be noted that end 170 of winding 168 is connected to the opposite end 171 of the winding 169 and both are then connected to ground. Thus, when energization is applied at the terminal 172 of the winding 168, it will magnetize the pole 166 with one magnetic polarity while if the winding 169 has electrical energy applied through its end 173, the pole 166 will have the opposite magnetic polarity. Thus for each pole there is a two winding magnetic coil and the two windings for one pole have been heretofore referred to as windings A and A' or B and B'.

With the above construction of a magnetizing coil for each pole, each of the eight stator poles shown in the specific embodiment of the present invention in FIG. 4 are individually indicated by the reference numerals 174–181 inclusive, advancing clockwise about the stator. The poles 174, 176, 178 and 180 each has a two winding magnetizing coil which are interconnected to form windings A and A' while poles 175, 177, 179 and 181 each has a two winding magnetizing coil interconnected to form windings B and B'.

Figure 5:
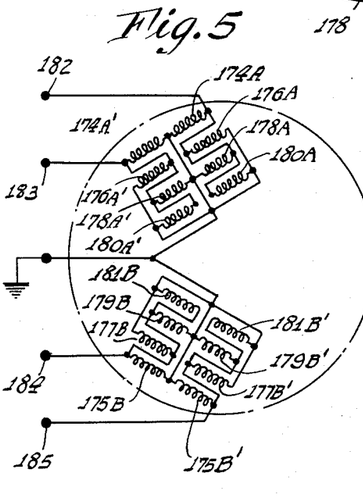
FIG. 5 is an electrical schematic diagram of the motor.

Referring to FIG. 5, the windings for the pole 174 are indicated by the reference characters 174A and 174A', the windings for pole 175 by 175B and 175B' and similarly for the other poles. All the ends of the windings are connected to ground while the other ends of the windings A are connected to a terminal 182, the other ends of the windings A' to a terminal 183, the other ends of the windings B to a terminal 184, and the other ends of the windings B' to a terminal 185. These terminals are shown on the electrical schematic diagram of the motor control circuit shown in FIG. 2 and hence form common terminals for indicating the manner in which the motor and circuit are interconnected.

It will be clear from FIG. 5 that at all times each pole is energized either by A or A' windings or B and B' windings. Also when energization is shifted from one winding to the other, the magnetic polarity of the pole is reversed. Moreover, the poles 174 and 178 will always have an identical magnetic polarity as will the poles 176 and 180 but the latter polarity will be the opposite of the former. The same applies to poles 175 and 179 and 177 and 181.

The windings as heretofore noted are energized in the sequence of AB, AB', A'B', A'B, AB to effect rotation of the motor one tooth pitch of the rotor. Each change from one energization of the windings to the next accordingly produces a ¼ rotor tooth pitch advancement of the rotor.

It will accordingly be appreciated that there has been disclosed a motor control circuit that is capable of translating input pulses into control of mechanical movement of a motor. The circuit moreover enables the movement of the motor to be in one direction or a direction in the reverse thereof depending upon the input signal to the control circuit. The movement of the motor moreover is correlated to the input signals by moving a predetermined amount for each input signal while in the absence of a signal, the control circuit maintains the motor energized at a "stopped" position.

Variations and modifications may be made within the scope of the claims and portions of the improvements may be used without others.

I claim:

1. A control circuit for a motor having at least a pair of pole pieces provided with a magnetizing coil for each pole piece with the circuit translating electrical input signals into an output movement of the motor by reversing the magnetization of one pole piece for one input signal and the other pole piece for the next signal, comprising a first switching circuit connected between a source of electrical energy and one magnetizing coil, a second switching circuit connected between a source of electrical energy and the other magnetizing coil, each of said switching circuits having two positions, one position energizing its associated magnetizing coil to provide magnetization of one pole piece of one polarity while the other position magnetizes the pole piece with the other polarity; a switching circuit actuating means connected to each switching circuit which upon being triggered by an electrical signal changes the position of its associated switching circuit; and means having two states with one state triggering one switching circuit actuating means and the other state triggering the other switching circuit actuating means, said means being connected to receive the input signals and change its state with each input signal, said means including one gate means connected to one switch circuit and a second gate means connected to the other switch circuit, a gate trigger means having one channel connected to one gate means and another channel connected to the other gate means, said gate trigger means changing its state with each electrical input signal to pass a signal on one channel and then the other, and means for conditioning the gate means to be actuated by the signal from the gate trigger means prior to the receipt of the signal from the gate trigger means to effect triggering of the directional control means associated with the actuated gate.

2. The invention as defined in claim 1 in which the gate conditioning means is connected to receive the input signal and for the consecutive input signals indicative of the same direction of rotation of the motor to maintain the same gate means conditioned for actuation.

3. The invention as defined in claim 1 in which the gate conditioning means is connected to receive the input signal and for input signals indicative of a change in the rotation of the motor to change the non-conditioned gate means to become conditioned and change the conditioned gate means to become non-conditioned.

4. A motor control circuit for controlling the output movement of a motor having four input terminals with energization of the two terminals at a time in the order of first and third, first and fourth, second and fourth, second and third, first and third producing step-by-step rotational movement of the motor comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other; and means having two states with one state triggering one directional control and the other state triggering the other directional control, said means being connected to receive the input signals and change its state with each input signal.

5. A motor control circuit for controlling the output movement of a motor having four input terminals with energization of the two terminals at a time in the order of first and third, first and fourth, second and fourth, second and third, first and third producing step-by-step rotational movement of the motor in one direction and a reversal of the order for rotation in the other direction, comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other; and means having two states with one state triggering one directional control and the other state triggering the other directional control, said means being connected to receive the input signals and to change its state with each input signal indicating the same direction of movement of the motor and to repeat the same state whenever the input signal indicates a reversal of direction of movement.

6. A motor control circuit for controlling the output movement of a motor having four input terminals with energization of the two terminals at a time in the order of first and third, first and fourth, second and fourth, second and third, first and third producing step-by-step rotational movement of the motor in one direction and a reversal of the order for movement in the other direction, comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other, with electrical input signals on one controlling rotational movement of the motor in one direction and electrical input signals on the other controlling rotational movement in the other direction; and means having two states with one state triggering one directional control and the other state triggering the other directional control, said means being connected to receive both the input signals and to repeat the same state when the input signal changes to be received from the other input terminal.

7. A motor control circuit for controlling the output movement of a motor having four input terminals with energization of the two terminals at a time in the order of first and third, first and fourth, second and fourth, second and third, first and third producing step-by-step rotational movement of the motor comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other; and means having two states with one state triggering one directional control and the other state triggering the other directional control, said means being connected to receive the input signals and change its state with each input signal, said means including one gate means connected to one output directional control and a second gate means connected to the other directional control, a gate trigger means having one channel connected to one gate means and another channel connected to the other gate means, said gate trigger means changing its state with each electrical input signal to pass a signal on one channel and then the other, and means for conditioning the gate means to be actuated by the signal from the gate trigger means prior to the receipt of the signal from the gate trigger means to effect triggering of the directional control means associated with the actuated gate.

8. A motor control circuit for controlling the output movement of a motor having four input terminals with energization of the two terminals at a time in the order of first and third, first and fourth, second and fourth, second and third, first and third producing step-by-step rotational movement of the motor in one direction and a reversal of the order for movement in the other direction, comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other; a pair of input terminals with electrical input signals on one controlling rotational movement of the motor in one direction and electrical input signals on the other controlling rotational movement in the other direction; and means having two states with one state triggering one directional control and the other state triggering the other directional control, said means being connected to receive both input signals and to repeat the same state when the input signal changes to be received from the other input terminal, said means including four gate means, each having an output and an input, means connecting the output of the first and third gate means to the one directional control means, means connecting the outputs of the second and fourth gate means to the second directional control means, gate trigger means having one channel connected to the inputs of the first and fourth gate means and another channel connected to the inputs of the second and third gate means, said trigger means changing its state with each electrical input signal to pass a signal on one channel and then the other, and means for conditioning two of the gate means to be actuated by the signal from the gate trigger means and for preventing actuation of the other two gate means by actuation of the signal from the gate trigger means, said gate actuated by the signal from the gate trigger means effecting triggering of the directional control means associated with the actuated gate.

9. The invention as defined in claim 8 in which the gate conditioning means is connected to receive the input signal and for the consecutive input signals indicative of the same direction of rotation of the motor to maintain the same gate means conditioned for actuation.

10. The invention as defined in claim 7 in which the gate conditioning means is connected to receive the input signal and for input signals indicative of a change in the rotation of the motor to change the non-conditioned two gate means to become conditioned and change the two conditioned gate means to become non-conditioned.

11. A control circuit for controlling the output movement of a motor having four input terminals with energization of the terminals in the sequence of a first and third, first and fourth, second and fourth, second and third, first and third producing step-by-step rotational movement of the motor comprising a circuit having a first, second, third and fourth electronic switch means, each of which is adapted to be connected between a source of electrical energy and its similarly numbered input terminal to control the flow of electrical energy to its associated terminal; a first directional control means connected to the first and second switch means and rendering one of the switch means conductive and the other non-conductive and a second directional control means connected to the third and fourth switch means and rendering one of the switch means conductive and the other non-conductive, with each directional control means upon actuation shifting the conduction from the conducting switch means to the other; directional control actuating means comprising a first, second, third and fourth gate means with the output of the first and third means being connected to the first directional control means to cause actuation thereof upon either of its gate means becoming actuated and the output of the second and fourth gate means being connected to the second directional control means to cause actuation thereof when either of its gate means is actuated; an input terminal for receiving the electrical input signals to the circuit; a gate conditioning means having two outputs with one output connected to the first and second gate means and the other output connected to the third and fourth gate means and having its input connected to receive the input signal, one output from said gate conditioning means causing its associated gate means to be conditioned for actuation and the other output rendering its associated gate means non-responsive to actuation; and gate trigger means having an input connected to receive the input signal and having two outputs, one output being connected to the input of the first and third gate means and the other output being connected to the second and fourth gate means, said trigger means producing an output signal alternately on each of its outputs with each input signal to the control circuit, said output signal causing actuation only of the gate means that both receives the gate trigger means output signal and is conditioned for actuation whereby a sequence of input signal causes sequential operation of the switch means to thereby effect movement of the motor.

12. A motor control circuit for controlling the output movement of a motor having four input terminals with energization of the terminals in the sequence of a first and third, first and fourth, second and fourth, second and third, first and third producing step-by-step rotational movement of the motor and a reversal of the sequence for a reverse movement of the motor comprising a circuit having a first, second, third and fourth electronic switch means, each of which is adapted to be connected between a source of electrical energy and its similarly numbered input terminal to control the flow of electrical energy to its associated terminal; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting the conduction from the conducting switch means to the other; directional control actuating means comprising a first, second, third and fourth gate means with the output of the first and third means being connected to the first directional control means to cause actuation thereof upon either of its gate means becoming actuated and the output of the second and fourth gate means being connected to the second directional control means to cause actuation thereof when either of its gate means is actuated; a first signal input terminal for receiving electrical input signals indicative of rotation of the motor in one direction and a second electrical input terminal for receiving signals indicative of rotation of the motor in the other direction; a gate conditioning means having two outputs with one output connected to the first and second gate switching means and the other output connected to the third and fourth gate switching means and having its input connected to both of the electrical input terminals, one of said outputs being energized for each input signal to cause its associated gate means to be conditioned for actuation and the other output rendering its associated gate means non-responsive to actuation, said gate conditioning means shifting its energization from one output to the other whenever the input signal changes to be received from the other input terminal; and gate triggering means having an input connected to receive the input signal and having two outputs, one output being connected to the input of the first and third gate means and the other output being connected to the second and fourth gate means, said gate triggering means producing an output signal alternately on each of its outputs with each input signal to the control circuit, said output signal causing actuation only of the gate means that both receives the gate trigger means output signal and is conditioned for actuation whereby a sequence of input signal on the input signal causes sequential operation of the switch means to thereby effect movement of the motor in either direction.

13. The invention as defined in claim 12 in which the gate triggering means includes a pair of electronic switches and the gate conditioning means includes a pair of electronic switches, said gate triggering means being connected to supply its triggering signal to the gate means after the gate conditioning means has conditioned the gate means.

14. The invention as defined in claim 13 in which the electronic switches of the gate trigger means are transistors and interconnected to form a "flip-flop" circuit with the input signal being impressed on the emitters; and the electronic switches of the gate conditioning means are transistors and interconnected to form a "flip-flop" circuit with the input signal being impressed on the bases.

15. A combination of a motor and a control circuit therefor for controlling the output movement of the motor, said motor having a plurality of windings connected to four input terminals with energization of two terminals at a time in the order of first and third, first and fourth, second and fourth, second and third, first and third producing step-by-step rotational movement of the motor; said circuit having a first, second, third and fourth electronic switch means, each of which is connected between a source of electrical energy and its similarly numbered motor input terminal to control the flow of electrical energy to the motor windings connected to the motor input terminals; a first directional control means having a first channel connected to the first switch means and a second channel connected to the second switch means and a second directional control means having a first channel connected to the third switch means and a second channel connected to the fourth switch means, each directional control means having only one channel energized and upon being triggered shifting energization from the one channel to its other; and means having two states with one state triggering one directional control and the other state triggering the other directional control, said means being connected to receive the input signals and change its state with each input signal.

16. The invention as defined in claim 15 in which the motor has a plurality of stator pole pieces, each of which has a magnetizing coil therefor composed of two separate windings whereby energization of one winding effects magnetization of the pole piece of one magnetic polarity while energization of the other winding effects magnetization of the pole piece of the other magnetic polarity.

References Cited in the file of this patent

UNITED STATES PATENTS

| | | |
|---|---|---|
| 2,706,270 | Stule | Apr. 12, 1955 |
| 2,774,026 | Towner | Dec. 11, 1956 |
| 2,922,095 | Hesse et al. | Jan. 19, 1960 |
| 2,941,136 | Maranette et al. | June 14, 1960 |
| 2,994,813 | Towner et al. | Aug. 1, 1961 |